United States Patent Office 3,786,146
Patented Jan. 15, 1974

---

3,786,146
FUNGICIDAL COMPOSITIONS COMPRISING N,N'-BIS-[(1 - AMINO - 2,2,2 - TRICHLORO)-ETHYL]-PIPERAZINES
Walter Ost, Klaus Thomas, and Dietrich Jerchel, Ingelheim am Rhein, and Karl-Richard Appel, Biberach-Rissegg, Germany, assignors to C. H. Boehringer Sohn, Ingelheim am Rhein, Germany
No Drawing. Application Nov. 4, 1970, Ser. No. 87,015, now Patent No. 3,696,106, dated Oct. 3, 1972, which is a continuation-in-part of application Ser. No. 793,187, Jan. 22, 1969, now Patent No. 3,595,916, dated July 27, 1971. Divided and this application July 13, 1972, Ser. No. 271,365
Claims priority, application Austria, Jan. 23, 1968, A 674/68; May 17, 1968, A 4,795/68
Int. Cl. A01n 9/22
U.S. Cl. 424—250            8 Claims

ABSTRACT OF THE DISCLOSURE

Fungicidal compositions comprising an inert liquid or comminuted solid carrier and an effective fungicidal amount of a compound of the formula

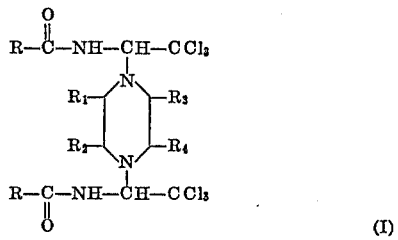

wherein

R is hydrogen or alkyl of 1 to 4 carbon atoms which may have from one to three halogen atoms attached thereto,
$R_1$ is hydrogen, alkyl of 1 to 3 carbon atoms or phenyl,
$R_2$ hydrogen, methyl or ethyl, and
$R_3$ and $R_4$ are each hydrogen or methyl;
and a fungicidal method using such compounds.

---

This is a division of copending application Ser. No. 87,015, filed Nov. 4, 1970, now U.S. Pat. 3,696,106 issued Oct. 3, 1972 which in turn is a continuation-in-part of copending application Ser. No. 793,187, filed Jan. 22, 1969, now U.S. Pat. 3,595,916 issued July 27, 1971.

This invention relates to novel fungicidal compositions comprising as an active ingredient an N,N'-bis-[(1-amido-2,2,2-trichloro)-ethyl]-piperazine, as well as to a method of killing fungi therewith.

More particularly, the present invention relates to fungicidal compositions consisting essentially of an inert carrier and an effective fungicidal amount of a piperazine compound of the formula

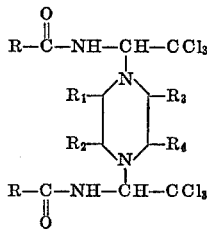

wherein

R is hydrogen or alkyl of 1 to 4 carbon atoms which may have from one to three halogen substituents attached thereto,
$R_1$ is hydrogen, alkyl of 1 to 3 carbon atoms or phenyl,
$R_2$ is hydrogen, methyl or ethyl, and
$R_3$ and $R_4$ are each hydrogen or methyl.

A compound of the Formula I may be prepared by reacting a compound of the formula

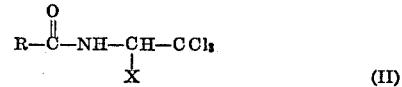

wherein R has the same meanings as in Formula I and X is a substituent which may easily be split off in the form of an anion, such as chlorine, bromine, arylsulfonyloxy, alkylsulfonyloxy, aryloxy, trifluoroacetoxy or arylcarbonyloxy, with a piperazine of the formula

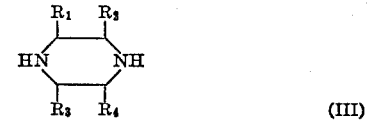

wherein $R_1$, $R_2$, $R_3$ and $R_4$ have the same meanings as in Formula I, pursuant to the following reaction formula:

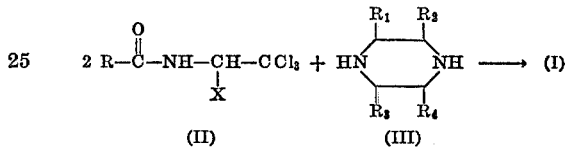

The reaction is preferably carried out in the presence of an inert organic solvent, such as tetrahydrofuran, dioxane, toluene, acetone or a chlorinated hydrocarbon, at a temperature between about −20 and +100° C., preferably between +20 and +40° C.

When in Formula II is chlorine or bromine, it is advantageous to added to the reaction mixture an equivalent amount of a tertiary amine, such as triethylamine. In those instances it is assumed that a reactive intermediate of the formula R—CO—N=CH—CCl₃ is formed, which then reacts further to undergo an additional reaction with the piperazine III and forms a compound of the Formula I.

The end products of the Formula I thus obtained are weak bases; they are colorless crystalline solids which are sparsely soluble in water. However, all of the bases are relatively easily soluble in dimethylsulfoxide, tetrahydrofuran, cyclohexanone, dimethylformamide, N - methylpyrrolidone and butyrolactone.

The starting compounds of the Formula II may be prepared pursuant to known processes, such as by exchange of the hydroxyl group in a compound of the formula R—CO—NH—CHOH—CCl₃ for a substituent X, as defined in connection with Formula II above.

The following examples illustrate the preparation of a number of compounds of the Formula I.

EXAMPLE 1

N,N'-bis-[(1-acetamido-2,2,2-trichloro)-ethyl]-piperazine

While stirring, a solution of 3.44 gm. (0.04 mol) of piperazine and 8.2 gm. (0.081 mol) of triethylamine in 60 cc. of peroxide-free tetrahydrofuran was added dropwise to a solution of 18.0 gm. (0.08 mole) of N-(1,2,2,2-tetrachloroethyl)-acetamide in 50 cc. of peroxide-free tetrahydrofuran. Thereafter, the reaction mixture was allowed to stand for one hour at room temperature, then vacuum-filtered, the filter cake of triethylamine hydrochloride was washed with tetrahydrofuran, and the filtrate was evaporated in vacuo. The semi-solid residue was digested with ether, and the crystalline product formed thereby was separated by vacuum filtration and washed with ether, yielding 15.1 gm. (81% of theory) of a colorless substance which was recrystallized from isopropanol.

The product was identified to be N,N'-bis-[(1-acetamido-2,2,2 - trichloro) - ethyl]-piperazine, decomposition point about 180° C. (depending upon the rate of heating), of the formula

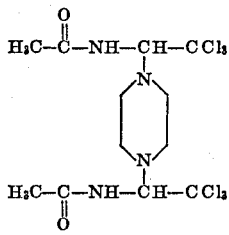

*Analysis.*—Calcd. (percent): C, 31.13; H, 3.92; N, 12.01. Found (percent): C, 31.07; H, 4.13; N, 11.94.

EXAMPLE 2

Using a procedure analogous to that described in Example 1, N,N' - bis-[(1 - dichloroacetamido - 2,2,2-trichloro)-ethyl]-piperazine, decomposition point about 180° C., of the formula

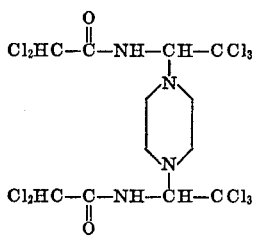

was prepared from N - (1,2,2,2 - tetrachloro-ethyl)-dichloroacetamide and piperazine. The yield was 94% of theory.

*Analysis.*—Calcd. (percent): C, 23.99; H, 2.35; Cl, 59.01; N, 9.33. Found (percent): C, 24.16; H, 2.33%; Cl, 58.5; N, 9.03.

EXAMPLE 3

Using a procedure analogous to that described in Example 1, N,N' - bis - [(1 - trichloroacetamido-2,2,2-trichloro)-ethyl -piperazine, decomposition point about 180° C., of the formula

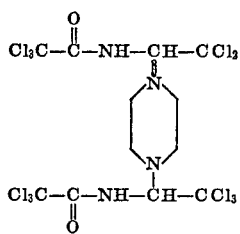

was prepared from N-(1,2,2,2-tetrachloroethyl)-trichloroacetamide and piperazine. The yield was 45% of theory.

*Analysis.*—Calcd. (percent): C, 21.52; H, 1.81; N, 8.36. Found (percent): C, 21.40; H, 1.95; N, 8.31.

EXAMPLE 4

Using a procedure analogous to that described in Example 1, N,N'-bis-[(1-formamido-2,2,2-trichloro)-ethyl]-2-methyl-piperazine, decomposition point about 167° C., of the formula

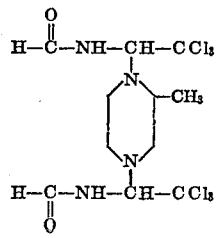

was prepared from N - (1,2,2,2 - tetrachloro-ethyl)-formamide and 2-methyl-piperazine. The glassy-amorphous residue remaining after evaporation of the tetrahydrofuran solution was dissolved in methylene chloride while gently heating, and after a few minutes of standing the reaction product crystallized out of the solution in the form of colorless crystals. The yield was 79% of theory.

EXAMPLE 5

Using a procedure analogous to that described in Example 1, N,N' - bis - [(1-trimethylacetamido-2,2,2-trichloro)-ethyl]-piperazine, decomposition point about 200° C., of the formula

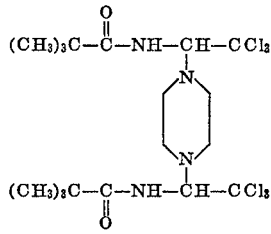

was prepared from N - (1,2,2,2-tetrachloro-ethyl)-pivalic acid amide and piperazine. The product partially precipitated from the tetrahydrofuran solution together with the triethylamine hydrochloride; a second fraction was obtained by evaporating the mother liquor in vacuo. The total yield was 85% of theory.

*Analysis.*—Calcd. (percent): C, 39.51; H, 5.53; N, 10.24. Found (percent): C, 39.79; H, 5.72; N, 10.26.

EXAMPLE 6

Using a procedure analogous to that described in Example 1, N,N'-bis-[(1-chloroacetamido-2,2,2-trichloro)-ethyl]-piperazine, decomposition point about 173° C., of the formula:

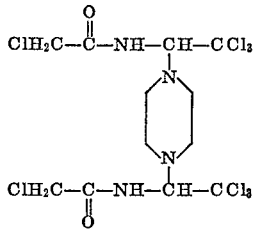

was prepared from N - (1,2,2,2-tetrachloroethyl)-chloroacetamide and piperazine. The yield was 86% of theory.

*Analysis.*—Calcd. (percent): C, 27.08; H, 3.03; N, 10.53. Found (percent): C, 27.12; H, 2.86; N, 10.20.

EXAMPLE 7

N,N'-bis-[(1-formamido-2,2,2-trichloro)-ethyl]-piperazine

While stirring, a solution of 4.3 gm. (0.05 mol) of piperazine and 10.5 gm. (0.104 mol) of triethylamine in 70 cc. of acetone was added dropwise to a solution of 21.1 gm. (0.1 mol) of (1,2,2,2-tetrachloro-ethyl)-formamide in 30 cc. of acetone. Thereafter, the reaction mixture was allowed to stand at room temperature, and then the precipitate consisting of the reaction product and triethylamine hydrochloride was separated by vacuum filtration, thoroughly washed first with water and then with cold methanol and finally dried at 40° C., yielding a colorless crystalline powder having a decomposition point of about 175° C. (depending upon the rate of heating), which was identified to be N,N'-bis-[(1-formamido-2,2,2-trichloro)-ethyl]-piperazine.

A second fraction of this compound was obtained by evaporation of the acetonic mother liquor and washing of the residue with cold methanol. The total yield was 18.7 gm. (86% of theory). The product was recrystallizable from dioxane.

*Analysis.*—Calcd. (percent): C, 27.61; H, 3.24; N, 12.88. Found (percent): C, 27.90; H, 3.38; N, 12.68.

EXAMPLE 8

N,N'-bis-[(1-formamido-2,2,2-trichloro)-ethyl]-piperazine 21.1 gm. (0.1 mol) of powdered N-(1,2,2,2-tetrachloro-ethyl)-formamide were suspended in 50 cc. of water and, while stirring, a mixture of 4.3 gm. (0.05 mol) of piperazine, 10.1 gm. (0.1 mol) of triethylamine and 50 cc. of water was added dropwise to the suspension at 20–25° C. Thereafter, the reaction mixture was stirred for 30 minutes more at room temperature, the aqueous phase was decanted, and the tacky crystalline residue was digested with 30 cc. of methanol, vacuum filtered, and washed with methanol. 50% of theory of N,N'-bis-[(1-formamido - 2,2,2 - trichloro)-ethyl]-piperazine was obtained.

EXAMPLE 9

N,N'-bis-[(1-formamido-2,2,2-trichloro)-ethyl]-piperazine 5.3 gm. (0.05 mol) of sodium carbonate were added to a solution of 21.1 gm. (0.1 mol) of N-(1,2,2,2-tetrachloro-ethyl)-formamide in 50 cc. of acetone, and then, while stirring, a solution of 4.3 gm. (0.05 mol) of piperazine in 50 cc. of acetone was added dropwise. Thereafter, the reaction mixture was stirred for thirty minutes more, the acetone was distilled off in vacuo, and the residue was washed first with water and then with cold methanol and finally dried. The yield was 77% of theory of N,N'-bis-[(1 - formamido-2,2,2-trichloro)-ethyl]-piperazine.

EXAMPLE 10

Using a procedure analogous to that described in Example 1, N,N'-bis-[(1-propionamido-2,2,2-trichloro)-ethyl]-piperazine, decomposition point 184–185° C., of the formula

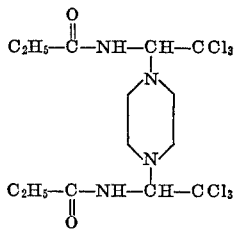

was prepared from N-[(1,2,2,2-trichloro)-ethyl]-propionamide and piperazine. The yield was 45% of theory.

EXAMPLE 11

Using a procedure analogous to that described in Example 1, N,N'-bis-[(1-propionamido-2,2,2-trichloro)-ethyl]-2-methyl-piperazine, decomposition point 165–167° C., of the formula

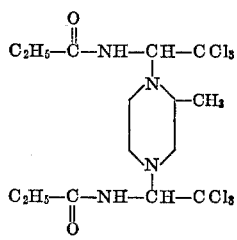

was prepared from N-[(1,2,2,2-tetrachloro)-ethyl]-propionamide and 2-methyl-piperazine. The yield was 66% of theory.

EXAMPLE 12

Using a procedure analogous to that described in Example 1, N,N'-bis[(1-fluoroacetamido-2,2,2-trichloro-ethyl]-piperazine, decomposition point 163–168° C., of the formula

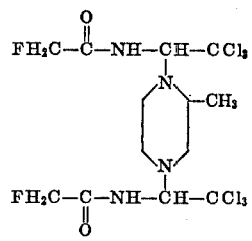

was prepared from N-[(1,2,2,2-tetrachloro)-ethyl]-fluoroacetamide and piperazine. The yield was 64% of theory.

EXAMPLE 13

Using a procedure analogous to that described in Example 1, N,N'-bis-[(1-fluoroacetamido-2,2,2-trichloro)-ethyl]-2-methyl-piperazine, decomposition point 138–142° C., of the formula

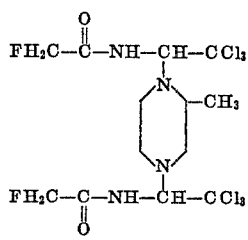

was prepared from N-[(1,2,2,2-tetrachloro)-ethyl]-fluoroacetamide and 2-methyl-piperazine. The yield was 29% of theory.

EXAMPLE 14

Using a procedure analogous to that described in Example 1, N,N'-bis-[(1-trichloroacetamido-2,2,2-trichloro)-ethyl]-2-methyl-piperazine, decomposition point 130–135° C., of the formula

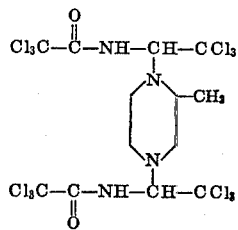

was prepared from N-[(1-2,2,2-tetrachloro)-ethyl]-trichloroacetamide and 2-methyl-piperazine. The yield was 50% of theory.

EXAMPLE 15

Using a procedure analogous to that described in Example 1, N,N'-bis-[(1-trifluoroacetamido-2,2,2-trichloro)-ethyl]-piperazine, decomposition point 155–158° C., of the formula

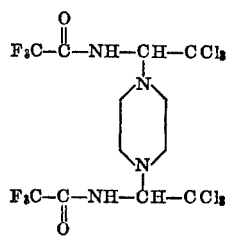

was prepared from N-[(1,2,2,2-tetrachloro)-ethyl]-trifluoroacetamide and piperazine. The yield was 76% of theory.

EXAMPLE 16

Using a procedure analogous to that described in Example 1, N,N'-bis-[(1-formamido-2,2,2-trichloro)-ethyl]-

2,5-dimethyl-piperazine, decomposition point 184° C., of the formula

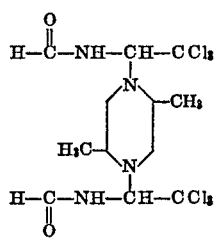

was prepared from N-[(1,2,2,2-tetrachloro)-ethyl]-formamide and a mixture of cis- and trans-isomers of 2,5-dimethyl-piperazine. The yield was 28% of theory.

EXAMPLE 17

Using a procedure analogous to that described in Example 1, N,N'-bis-[(1-formamido-2,2,2-trichloro)-ethyl]-2,3,5,6-tetramethyl-piperazine, decomposition point 180° C., of the formula

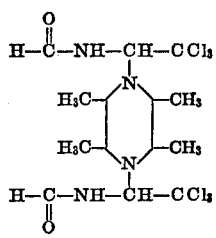

was prepared from N-[(1,2,2,2-tetrachloro)-ethyl]-formamide and a stereoisomeric mixture of 2,3,5,6-tetramethyl-piperazine. The yield was 45% of theory.

EXAMPLE 18

Using a procedure analogous to that described in Example 1, N,N'-bis-[(1-formamido-2,2,2-trichloro)-ethyl]-2,3-trans-dimethyl-piperazine, decomposition point 182° C., of the formula

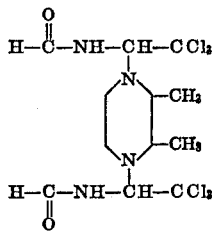

was prepared from N-[(1,2,2,2-tetrachloro)-ethyl]-formamide and trans-2,3-dimethyl-piperazine. The yield was 17% of theory.

EXAMPLE 19

Using a procedure analogous to that described in Example 1, N,N'-bis[(1-formamido-2,2,2-trichloro)-ethyl]-trans-2-methyl-3-ethyl-piperazine, decomposition point 172° C. of the formula

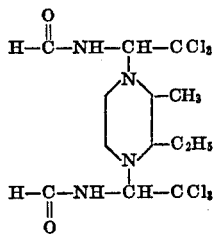

was prepared from N-[(1,2,2,2-tetrachloro)-ethyl]-formamide and trans-2-methyl-3-ethyl-piperazine. The yield was 15% of theory.

EXAMPLE 20

Using a procedure analogous to that described in Example 1, N,N'-bis-[(1-formamido-2,2,2-trichloro)-ethyl]- cis-2,3,-dimethyl-piperazine, decomposition point 173° C., was prepared from N-[(1,2,2,2-tetrachloro)-ethyl]-formamide and cis-2,3,-dimethyl-piperazine. The yield was 36% of theory.

EXAMPLE 21

Using a procedure analogous to that described in Example 1, N,N'-bis-[(1-formamido-2,2,2-trichloro)-ethyl]-2-phenyl-piperazine, decomposition point 192° C., of the formula

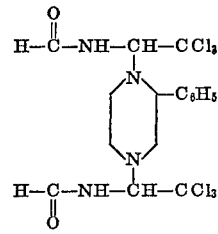

was prepared from N-[(1,2,2,2-tetrachloro)-ethyl]-formamide and 2-phenyl-piperazine. The yield was 16% of theory.

EXAMPLE 22

Using a procedure analogous to that described Example 1, N,N'-bis[(1-formamido-2,2,2-trichloro)-ethyl]-2-ethyl-piperazine, decomposition point 164–166° C., of the formula

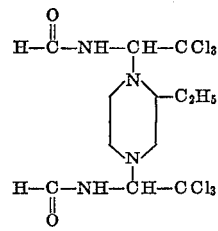

was prepared from N-[(1,2,2,2-tetrachloro)-ethyl]-formamide and 2-ethyl-piperazine. The yield was 40% of theory.

EXAMPLE 23

Using a procedure analogous to that described in Example 1, N,N'-bis[(1-formamido-2,2,2-trichloro)-ethyl]-2,3,5-trimethyl-piperazine, decomposition point 168° C., of the formula

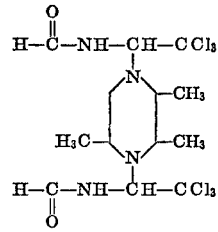

was prepared from N-[(1,2,2,2-tetrachloro-ethyl]-formamide and a stereoisomeric mixture of 2,3,5-trimethyl-piperazine. The yield was 12% of theory.

EXAMPLE 24

Using a procedure analogous to that described in Example 1, N,N'-bis-[(1-formamido-2,2,2-trichloro)-ethyl]-2-n-propyl-piperazine, decomposition point 174° C., of the formula

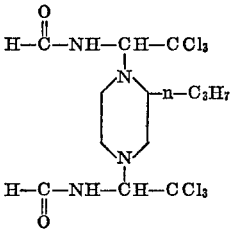

was prepared from N-[(1,2,2,2-tetrachloro)-ethyl]-formamide and 2-n-propyl-piperazine. The yield was 20% of theory.

EXAMPLE 25

Using a procedure analogous to that described in Example 1, N,N'-bis-[(1-formamido-2,2,2-trichloro)-ethyl]-2,6-dimethyl-piperazine, decomposition point 171-172° C., of the formula

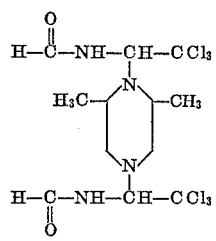

was prepared from N-[(1,2,2,2-tetrachloro)-ethyl]-formamide and 2,6-dimethyl-piperazine. The yield was 11% of theory.

EXAMPLE 26

N,N'-bis-[(1-formamido-2,2,2-trichloro)-ethyl] piperazine

A mixture consisting of 2.1 gm. (0.025 mol) of piperazine, 5.1 gm. (0.05 mol) of triethylamine, 6.8 gm. (0.05 mol) of [(1-formamido-2,2,2-trichloro)-ethoxy]-benzene and 50 cc. of absolute tetrahydrofuran was allowed to stand for 14 hours at room temperature, and thereafter was refluxed for two hours. Subsequently, the reaction solution was filtered, the filtrate was evaporated in vacuo, and the viscous brown residue, which had an odor of phenol, was digested with 15 cc. of methanol. After several hours of standing, about 10% of theory of N,N'-bis-[(1-formamido - 2,2,2 - trichloro)-ethyl]-piperazine had crystallized out.

The starting compound, [(1 - formamido-2,2,2-trichloro)-ethoxy]-benzene, M.P. 93–94° C., was obtained with a yield of 83% of theory from N-[(1,2,2,2-tetrachloro)-ethyl]-formamide and phenol in the presence of triethylamine.

EXAMPLE 27

N,N'-bis-[(1-formamido-2,2,2-trichloro)-ethyl]-piperazine 1.2 gm. (0.014 mol) of piperazine and 7.1 gm. (0.028 mol) of [1 - formamido - 1 - (methylsulfonyl)-2,2,2-trichloro]-ethane were dissolved in 50 cc. of absolute tetrahydrofuran, 2.9 gm. (0.028 mol) of triethylamine were added to the solution, and the mixture was allowed to stand for several hours at room temperature. Thereafter, the reaction solution was diluted with water, and the precipitate formed thereby was collected by vacuum filtration and washed first with water and then with methanol. 96% of theory of N,N'-bis-[(1-formamido-2,2,2-trichloro)-ethyl]-piperazine were obtained.

The starting compound, [1-formamido-1-(methylsulfonyl)-2,2,2-trichloro]-ethane, M.P. 132–133° C., was prepared in the following manner: N-[(1,2,2,2-tetrachloro)-ethyl]-formamide was first reacted with methylmercaptan in the presence of triethylamine, yielding 82% of theory of (1-formamido-1-methylmercapto-2,2,2-trichloro)-ethane, M.P. 122–123° C., which was subsequently oxidized with hydrogen peroxide in acetic acid at 20°C. The yield was 66% of theory.

The compounds embraced by Formula I above have useful properties. More particularly, they are highly effective fungicides with very low phytotoxicity; thus they may be effectively used for prophylactic as well as curative treatment of plants against phytopathogenic fungi. For instance, complete prevention against infestation is achieved in the case of a number of true mildew fungi, such as *Erysiphe graminis* and *Erysiphe polygoni*.

Furthermore, the compounds of the Formula I are effective in combatting rust fungi, such as *Uromyces fabae* and *Luccinia arenariae*; causes of wilting disease, such as *Verticillium alboatrum*; causes of plant scabs, such as *Venturia inaequalis*; mold fungi, such as *Aspergillus niger*; and various other harmful fungi, such as Fusaria and Ophiobuli.

Particularly noteworthy is the good systemic effect of the compounds of the Formula I.

The compounds of the Formula I are also useful as anthelmintics and enhance the germination of seeds, such as pea and cotton seeds.

The compounds of the Formula I also exhibit very low toxicity toward warm-blooded animals.

For prophylactic or curative treatment of plants against fungus infestation, the compounds of the Formula I are incorporated as active ingredients into customary fungicidal compositions, i.e. compositions consisting essentially of a liquid or comminuted solid inert carrier and an effective fungicidal amount of the active ingredient, such as solutions, emulsion concentrates, suspendable or wettable powders, dusting powders, granulates and sprays. The effective fungicidal active ingredient content of these compositions is about 0.5 to 85% by weight, preferably 0.5 to 50% by weight.

For instance, an emulsion concentrate contains about 0.5 to 20% by weight, preferably 5 to 10% by weight, of a compound of the Formula I. Suitable solvents for the preparation of emulsion concentrates comprising a compound of the Formula I as an active ingredient are, for example, mixture of dimethylformamide or N-methylpyrrolidone with alcohols or glycols. Suitable emulsifiers and wetting agents which may be used for the preparation of such emulsion concentrates are ionic or non-ionic compounds, such as nonylphenol polyglycol ether, or mixtures of non-ionic and ionic, preferably anionic, compounds as well as ampholytes. The emulsifier content of the emulsion concentrate is about 0.5 to 45% by weight, preferably 5 to 40% by weight.

The active ingredient content of a wettable powder is about 0.5 to 80% by weight, preferably 20 to 60% by weight. Suitable emulsifiers and wetting agents which may be used for the preparation of wettable powders are non-ionic or ionic compounds of the type described in the preceding paragraph. The total amount of emulsifier and wetting agent in such wettable powders is about 0.5 to 25% by weight, preferably 2 to 25% by weight. Suitable powdery inert carriers are, for example, bentonite, kaolin and colloidal silicic acid.

The fungicidal compositions comprising a compound of the Formula I as an active ingredient are, if necessary, diluted with water to an active ingredient concentration of 0.5 to 0.00001% prior to their use for combatting fungi. Dusting powders may have a higher active ingredient concentration. The upper limit for the application concentration is predicated upon the relatively low phytotoxicity.

The following examples illustrate a few fungicidal compositions comprising a compound of the Formula I as an active ingredient and represent the best mode contemplated of putting the invention to practical use. The percentages are percent by weight.

EXAMPLE 28

| Dusting powder: | Percent |
|---|---|
| N,N'-bis-[(1 - formamido - 2,2,2 - trichloro)-ethyl]-piperazine | 1 |
| Talcum | 98 |
| Methylcellulose | 1 |

The components were admixed with each other, and the mixture was milled until homogeneous. The resulting powder was an effective fungicidal composition, especially against mildew and the like.

EXAMPLE 29

Wettable powder:

| | Percent |
|---|---|
| N,N'-bis-[(1 - formamido - 2,2,2 - trichloro)-ethyl]-2-methyl-piperazine | 25 |
| Kaolin | 55 |
| Colloidal silicic acid | 10 |
| Lignin sulfonate (dispersing agent) | 9 |
| Sodium tetrapropylene benzene sulfonate (wetting agent) | 1 |

The components were admixed, the mixture was milled until homogeneous, and prior to use the powder was suspended in an amount of water such that the active ingredient concentration in the aqueous suspension was from 0.00001 to 0.5% by weight. The suspension was an effective fungicidal spray, especially against mildew and the like.

EXAMPLE 30

Emulsion concentrate:

| | Percent |
|---|---|
| N,N'-bis-[(1 - acetamido - 2,2,2 - trichloro)-ethyl]-piperazine | 10 |
| Sodium tetrapropylene benzene sulfonate (anionic emulsifier) | 5 |
| Nonylphenol polyglycol ether (non-ionic emulsifier) | 20 |
| Propyleneglycol | 32.5 |
| N-methylpyrrolidone | 32.5 |

The components were uniformly admixed with each other, and prior to use the resulting concentrate was diluted with water to the desired active ingredient content between 0.00001 and 0.5% by weight. The resulting aqueous emulsion was an effective fungicidal spray, especially against mildew and the like.

EXAMPLE 31

Aerosol spray:

| | Percent |
|---|---|
| N,N'-bis-[(1-trichloroacetamido - 2,2,2 - trichloro)-ethyl]-piperazine | 0.05 |
| Sesame oil | 0.10 |
| N-methylpyrrolidone | 10.00 |
| Propellant gas | 89.85 |

The components were admixed in customary fashion, and the mixture was charged into aerosol cntainers provided with a spray valve. The resulting aerosol was an effective fungicidal spray, especially against mildew and the like.

EXAMPLE 32

Wettable powder:

| | Percent |
|---|---|
| N,N'-bis-[(1 - trimethylacetamido - 2,2,2 - trichloro)-ethyl]-piperazine | 85 |
| Calcium lignin sulfonate | 8 |
| Colloidal silicic acid | 5 |
| Diisobutyl naphthalene sodium sulfonate | 2 |

The components were admixed, the mixture was milled until homogeneous, and prior to use the powder was suspended in an amount of water such that the active ingredient concentration in the aqueous suspension was from 0.00001 to 0.5% by weight. The suspension was an effective fungicidal spray, especially against mildew and the like.

Analogous results were obtained when any one of the other compounds embraced by Formula I was substituted for the particular piperazine compounds in Examples 28 through 32. Likewise, the amounts and nature of the inert ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A fungicidal composition consisting essentially of an inert carrier and an effective fungicidal amount of a compound of the formula

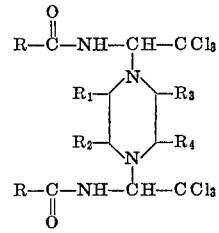

wherein
R is hydrogen or alkyl of 1 to 4 carbon atoms which may have from one to three halogen atoms attached thereto,
$R_1$ is hydrogen, alkyl of 1 to 3 carbon atoms or phenyl,
$R_2$ is hydrogen, methyl or ethyl, and
$R_3$ and $R_4$ are each hydrogen or methyl.

2. A fungicidal composition according to claim 1, wherein
R is hydrogen, alkyl of 1 to 4 carbon atoms, chloromethyl, dichloromethyl, trichloromethyl, fluoromethyl or trifluoromethyl,
$R_1$ is hydrogen, alkyl of 1 to 3 carbon atoms or phenyl,
$R_2$ is hydrogen, methyl or ethyl, and
$R_3$ and $R_4$ are each hydrogen or methyl.

3. A fpngicidal composition according to claim 1, wherein said compound is N,N'-bis-[(1-formamido-2,2,2-trichloro)-ethyl]-2-methyl-piperazine.

4. A fungicidal composition according to claim 1, wherein said compound is N,N'-bis[(1-formamido-2,2,2-trichloro)-ethyl]-piperazine.

5. The method of killing fungi, which comprises contacting said fungi with an effective fungicidal amount of a compound of the formula

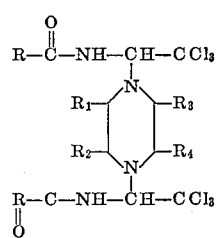

wherein
R is hydrogen or alkyl of 1 to 4 carbon atoms which may have from one to three halogen atoms attached thereto,
$R_1$ is hydrogen, alkyl of 1 to 3 carbon atoms or phenyl,
$R_2$ is hydrogen, methyl or ethyl, and
$R_3$ and $R_4$ are each hydrogen or methyl.

6. The method according to claim 1, wherein
R is hydrogen, alkyl of 1 to 4 carbon atoms, chloromethyl, dichloromethyl, trichloromethyl, fluoromethyl or trifluoromethyl,
$R_1$ is hydrogen, alkyl of 1 to 3 carbon atoms or phenyl,
$R_2$ is hydrogen, methyl or ethyl, and
$R_3$ and $R_4$ are each hydrogen or methyl.

7. The method according to claim 1, wherein said compound is N,N'-bis-[(1-formamido-2,2,2-trichloro)-ethyl]-2-methyl-piperazine.

8. The method according to claim 1, wherein said compound is N,N'-bis-[(1-formamido-2,2,2-trichloro)-ethyl]-piperazine.

References Cited
UNITED STATES PATENTS 3,624,088  11/1971  Benko et al. _____ 260—288 R ALBERT T. MEYERS, Primary Examiner L. SCHENKMAN, Assistant Examiner

UNITED STATES PATENT OFFICE
CERTIFICATE OF CORRECTION

Patent No. 3,786,146      Dated January 15, 1974

Inventor(s) WALTER OST, KLAUS THOMAS, DIETRICH JERCHEL and KARL-RICHARD APPEL

It is certified that error appears in the above-identified patent and that said Letters Patent are hereby corrected as shown below:

Col. 1, line 2 — correct "Amino" to read --Amido--.

Col. 2, line 34 — after "When" insert --X--.

Col. 2, line 35 — correct "added" to read --add--.

Col. 3, line 16 — correct "12.01" to read --12.10--.

Col. 3, line 46 — correct "CCl$_2$" to read --CCl$_3$--.

Col. 6, line 7 — correct the formula to read

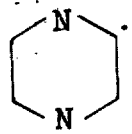

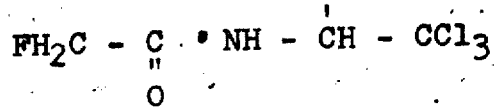

Col. 10, line 3 — correct "Luccinia" to read --Puccinia--.

Signed and sealed this 8th day of October 1974.

(SEAL)
Attest:

McCOY M. GIBSON JR.
Attesting Officer

C. MARSHALL DANN
Commissioner of Patents